US008600549B2

(12) United States Patent
Park

(10) Patent No.: US 8,600,549 B2
(45) Date of Patent: Dec. 3, 2013

(54) AUTOMATIC DRUG DISPENSING AND DOSING TIME REMINDER DEVICE

(76) Inventor: Doo Hwan Park, Busan (KR)

( * ) Notice: Subject to any disclaimer, the term of this patent is extended or adjusted under 35 U.S.C. 154(b) by 224 days.

(21) Appl. No.: 12/934,267

(22) PCT Filed: Apr. 27, 2009

(86) PCT No.: PCT/KR2009/002180
§ 371 (c)(1), (2), (4) Date: Sep. 23, 2010

(87) PCT Pub. No.: WO2009/134038
PCT Pub. Date: Nov. 5, 2009

(65) Prior Publication Data
US 2011/0022224 A1 Jan. 27, 2011

(30) Foreign Application Priority Data
May 2, 2008 (KR) ........................ 10-2008-0041315

(51) Int. Cl.
*G06F 17/00* (2006.01)
*B65H 1/00* (2006.01)

(52) U.S. Cl.
USPC ................... 700/240; 221/122; 221/2; 221/9; 700/236; 700/237

(58) Field of Classification Search
USPC ................... 221/122, 2, 9; 700/236, 237, 240
See application file for complete search history.

(56) References Cited

U.S. PATENT DOCUMENTS

| | | | | | |
|---|---|---|---|---|---|
| 4,838,453 | A * | 6/1989 | Luckstead | 221/2 |
| 5,441,165 | A * | 8/1995 | Kemp et al. | 221/2 |
| 5,522,525 | A * | 6/1996 | McLaughlin et al. | 221/4 |
| 6,021,918 | A * | 2/2000 | Dumont et al. | 221/2 |
| 6,295,728 | B1 * | 10/2001 | Shin et al. | 29/840 |
| 6,471,087 | B1 * | 10/2002 | Shusterman | 221/2 |
| 6,702,146 | B2 * | 3/2004 | Varis | 221/3 |
| 7,317,803 | B1 | 1/2008 | Prabhakar et al. | |
| 7,831,336 | B2 * | 11/2010 | Gumpert | 700/244 |
| 2002/0093429 | A1 | 7/2002 | Matsushita et al. | |

FOREIGN PATENT DOCUMENTS

| | | |
|---|---|---|
| JP | 9-253172 | 9/1997 |
| JP | 2003-230620 | 8/2003 |
| JP | 2006-230842 | 9/2006 |
| KR | 10-2002-0061154 | 7/2002 |
| KR | 10-2006-0059627 | 6/2006 |

OTHER PUBLICATIONS

International Search Report for PCT/KR2009/002180 mailed Jan. 4, 2010.

* cited by examiner

*Primary Examiner* — Timothy Waggoner
(74) *Attorney, Agent, or Firm* — Christopher Paul Mitchell

(57) ABSTRACT

The invention relates to an automatic drug dispensing and dosing time reminder device which automatically dispenses one dose of medication at every scheduled dosage time while simultaneously reminding a patient of the dosage time through a voice and a lamp. The device uses a motor, rotating body, and position sensor to dispense medications at the scheduled dosage times. The front face of the device includes an interface to program in the scheduled dosage times.

4 Claims, 13 Drawing Sheets

(A)

(B)

AUTOMATIC DRUG DISPENSING AND DOSING TIME REMINDER DEVICE

RELATED APPLICATIONS

This application is a 371 application of International Application No. PCT/KR2009/002180, filed Apr. 27, 2009, which in turn claims priority from Korean Patent Application No. 10-2008-0041315, filed May 2, 2008, both of which are incorporated herein by reference in their entireties.

TECHNICAL FIELD

The present invention relates to an automatic drug dispensing and dosing time reminder device, and more particularly, to an automatic drug dispensing and dosing time reminder device which automatically dispenses one does of medication at every scheduled dosage time set by a user and simultaneously reminds a patient of the dosage time through a voice and a lamp to allow the patient to take prescribed medication at an accurate time, thus reminding the patient not to forget the dosage time in cases where the patient is a senior or weak person or busy and maximizing effects of treatment.

BACKGROUND ART

In general, patients who have received medical treatment receive drugs for the treatment as prescribed, the dosage time and period of the drugs depend on the patients or the feature of the drugs, and generally, is once a day, three times a day (morning, afternoon, and evening), four times a day (morning, afternoon, evening, and before sleeping), or a specific time.

However, the dosage time depends on memory of the family who should take drugs in a home, including the patients themselves, such that they frequently forget the dosage time for busy in everyday life. In particular, children who has difficulty in recognizing time or the old having weak memory, and the people with hearing and visual disability have difficult in taking drugs at a predetermined time, such that the effect of treatment is reduced.

Accordingly, a device that allows a patient to set a dosage time and reminds the patients the dosage time at the set time, using a voice or a lamp has been proposed in the related art.

That is, Japanese Patent Publication No. 2001-198195 (Publication Date: 2001 Jul. 24) and Korean Patent Publication No. 2006-59627 (Publication Date: 2006 Jun. 2) disclose that drugs are put in containers for time and date, and a voice is outputted and a lamp is blinked at scheduled dosage times.

The dosing time reminder device of the related art has an effect of accurately reminder a patient of the dosage time, but cannot automatically dispense the drugs the patient should take.

That is, in the related art, drugs to take are stored in a plurality of containers integrally formed with the dosage time reminder device and the patients have to directly take out the drugs from the containers when the reminder device confirms the dosage time and take the drugs. Therefore, the old, children or even normal adults may take the drugs from an incorrect container, and this problem becomes more serious, when there are several kinds of drugs for one time.

DISCLOSURE

Technical Problem

It is an object of the present invention to provide a more reliable dosage time reminder device that by dividing a container storing drugs into a plurality of equal parts, putting in one dose of medication in the divided container such that the one dose of medication is automatically dispensed at the scheduled dosage time in order prevent the old with weak sight or children, or even normal adults from taking wrong drugs, in addition to having common function of reminder the user of the scheduled dosage time with a voice or a lamp.

Further, it is another object of the present invention to induce intimacy between a patient and the other families and mentally relieve the patient to improve the efficiency of treatment by allowing recording and playing a voice that will be outputted at every dosage time to reminder them of the dosage time through their voice.

Further, it is another object of the present invention to increase dosage efficiency by outputting a voice and blinking a lamp telling the dosage time, until one dose of medication that has been dispensed from the container at the scheduled dosage time is taken.

Technical Solution

The present invention is characterized in that an outlet through which one dose of medication is discharged is formed at one side of the front of a predetermined-shaped main body, and a circular mounting plate integrally protrudes from the top of the main body, an arc-shaped first discharge groove where a position sensor is disposed is formed at one end on the top of the main body inside the mounting plate, and a rotating shaft protrudes through a stepped portion at the center of the mounting plate, a through-hole through which the rotating shaft is inserted is formed at the center of the bottom above the mounting plate and a container having a second discharging groove at one side which is the same as the first discharging groove is detachably disposed, a rotating body that is connected with the rotating shaft at the lower portion of the center, has partition walls at regular intervals at predetermined angles from the center to define spaces and reflective units attached to the lower ends of the partition walls is disposed in the container, a motor that is connected with the rotating shaft and rotating the rotating body is disposed at one side in the main body, a discharging channel is formed between the first discharging groove and the outlet such that they communicate with each other, an input unit composed of a dosing time set part, a time set part, a power button, a reset button, and a midday set part to set information on the current time and a dosing time, and an output unit composed of a time indicating unit, a speaker, and an indicating lamp to output a result according to the information set by the input unit are disposed on the front of the main body, and a controller that controls the motor by using the basic information set by the input unit and a position sensor, and displays the information through the output unit.

Another embodiment of the present invention is characterized in that the input unit is provided with a record button and a microphone to record a voice message transmitted through the microphone in the controller, and the recorded voice message is played through the speaker.

Another embodiment of the present invention is characterized in that a drug pack sensor is additionally disposed at the outlet, such that the controller outputs a voice message telling a dosing time in a predetermined period and blinks an indicating lamp, until a drug pack is taken out of the outlet.

Advantageous Effects

The present invention automatically discharges one dose of medication at the scheduled dosage time, in addition to perform the common function of telling every time it's the dosage time set by the user, using a voice and a lamp, such that it is possible to prevent the old with weak sight or children, or even normal adults from taking wrong drugs, thereby increasing reliability of the dosing time reminder device.

Further, it is possible to induce intimacy between a patient and the other families and mentally relieve the patient by allowing recording and playing a voice that will be outputted at every dosage time to reminder them of the dosage time through their voice, such that it is possible to improve the efficiency of treatment.

Further, it is possible to increase efficiency of dosage as much as possible by outputting a voice and blinking a lamp for telling it's the dosing time in a predetermined period, until the user takes out the discharge drug.

REFERENCE NUMERALS

| | |
|---|---|
| 1: Rotating body | 2: Partition wall |
| 4: Reflective unit | 5: Cover |
| 10: Container | 11: Support edge |
| 12: Fixing protrusion | 13: Through-hole |
| 14: Body | 15: Second discharging groove |
| 16: Spring | 20: Mounting plate |
| 21: Stepped portion | 22: Mounting plate |
| 23: Rotating shaft | 25: Fixing groove |
| 26: First discharging groove | |
| 27: Motor | 30: Main body |
| 31: Dosing time set part | |
| 31a~31c: First to third set button | |
| 32: Time set part | 32a: Hour adjusting volume |
| 32b: Minute adjusting volume | |
| 33: Reset button | 34: Record button |
| 34a: Record indicating lamp | |
| 35: Microphone | 36: Speaker |
| 37: Midday set part | |
| 38: Time indicating part | 39: Indicating lamp |

-continued

| | |
|---|---|
| 40a: Operating part | 40b: Output unit |
| 41: Outlet | 42: Discharging channel |
| 50: MPU | 51: Position sensor |
| 52: Drug pack sensor | 53: Drive |
| 54: Voice chip | 55: Backup battery |
| 60: Controller | |

[Best Mode]

An automatic drug dispensing and dosing time reminder device according to the present invention is described hereafter in detail with reference to FIGS. 1 to 9 in the accompanying drawings.

Figure 1:
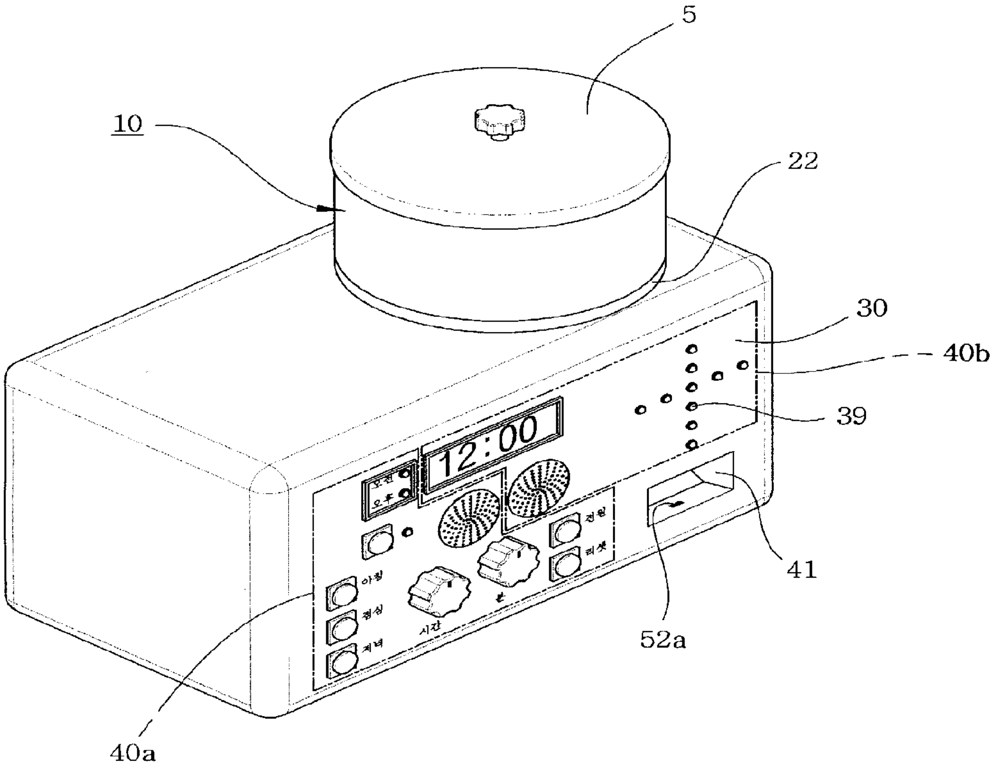
FIG. 1 is a perspective view showing the external shape of an automatic drug dispensing and dosing time reminder device according to the present invention.

FIG. 1 is a perspective view showing the external shape of an automatic drug dispensing and dosing time reminder device according to the present invention, in which a cylindrical container 10 that is integrally fixed to a side of a predetermined-shaped main body 30 without moving by a mounting plate 22 and accommodates a rotating body 1 in which one dose of medication is separately disposed, a cover 5 is disposed on the container 10, a motor 27 that discharges one dose of medication from the container 10 is disposed at one side in the main body 30, and a controller 60 that controls the entire automatic drug dispensing and dosing time reminder device of the present invention is disposed at the other side in the main body 30.

An outlet 41 through which the one dose of medication is discharged from the container 10 is formed at one side of the front of the main body 30, while an input unit 40*a* for setting basic information for operating the system and an output unit 40*b* that outputs a result from the information set by the input unit 40*a* are provided at the other side of the front of the main body 30.

Figure 2:
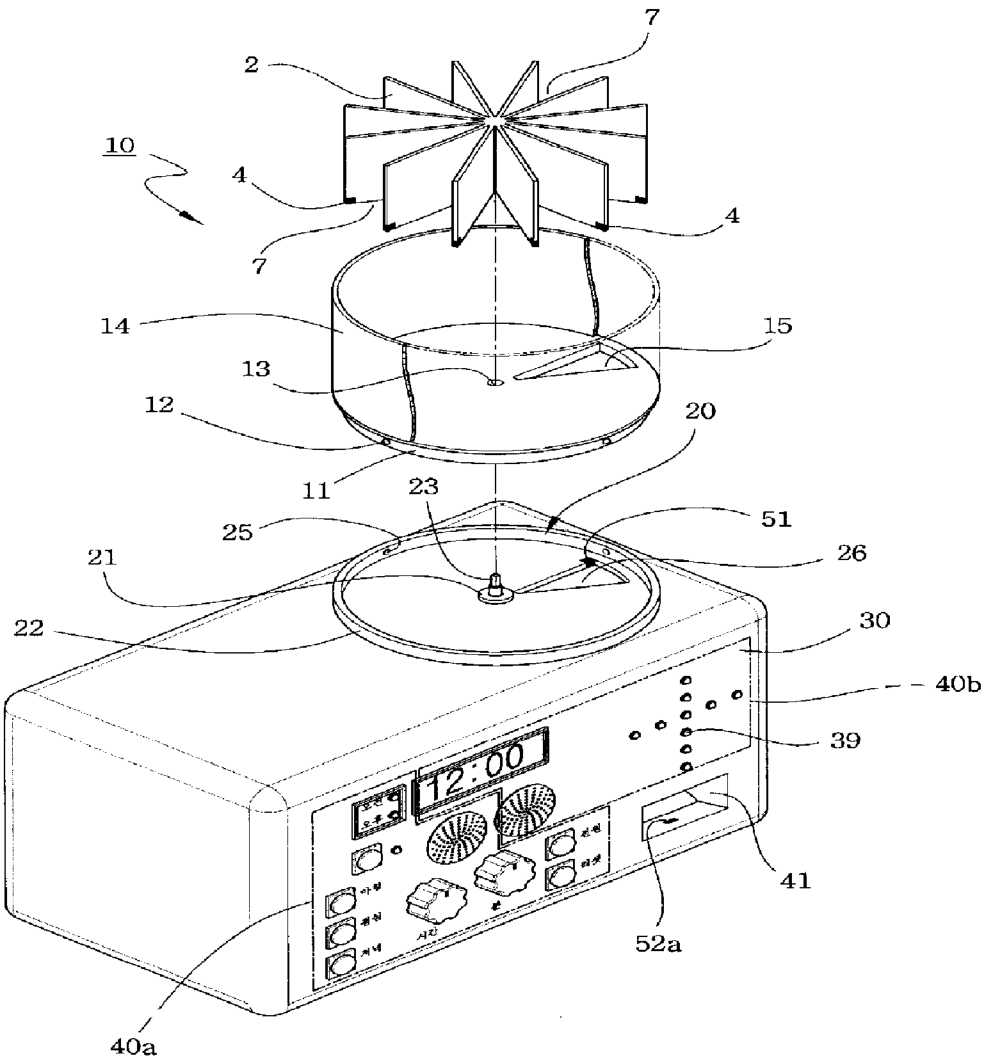
FIG. 2 is an exploded perspective view of the automatic drug dispensing and dosing time reminder device according to the present invention, with the cover removed.
Figure 3:
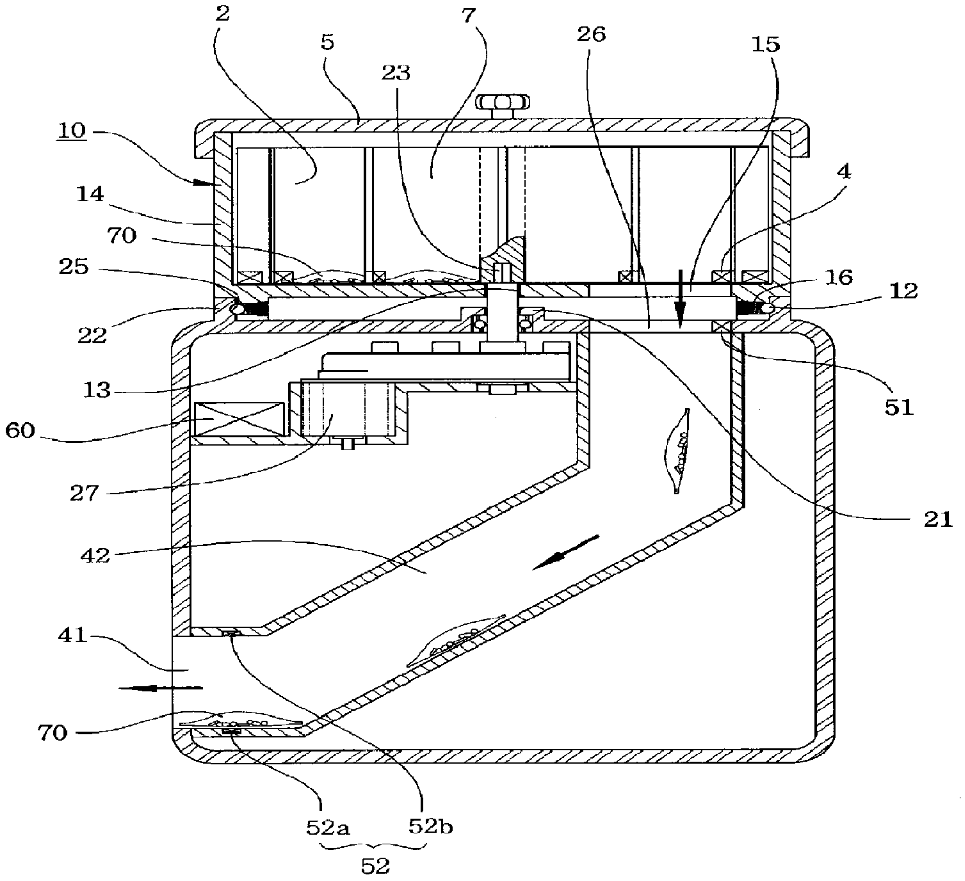
FIG. 3 is a front cross-sectional view of the automatic drug dispensing and dosing time reminder device according to the present invention.

FIG. 2 is an exploded perspective view of the automatic drug dispensing and dosing time reminder device according to the present invention, with the cover removed and FIG. 3 is a front cross-sectional view of the automatic drug dispensing and dosing time reminder device according to the present invention, in which the mounting plate 22 on the top of the main body 30 has a plurality of fixing groove 25 formed at regular intervals on the inner wall to fit the container 10, a rotating shaft 23 of the motor 27 fixed in the main body 30 protrudes through a stepped portion 21 at the center, an arc-shaped first discharging groove 26 through which one dose of medication is discharged is formed through a side of the top of the main body 30, inside the mounting plate 22, and a position sensor 51 that senses the stop time of the motor 27 is disposed at one end of the first discharging groove 26.

The container 10 seated on the mounting plate 22 has a support edges 11 disposed at the same intervals as the fixing grooves 25 to correspond to the fixing grooves 25 and pressed by springs 16, and a body 14 where drugs are put in is integrally disposed on the support edges 11, a through-hole 13 through which the rotating shaft 23 of the motor 27 is inserted is formed at the center of the body 14, and a second discharging groove 15 corresponding to the first discharging groove 26 is formed through one side of the bottom of the body 14.

The rotating body 1 has a plurality of partition walls 2, which are formed at regular intervals from the center point to separately put in one dose of medication and define spaces 7 where the one dose of medication is stored, reflective units 4 that reflects infrared laser radiated from the position sensor 51 are disposed at the lower portions of the ends of the partition walls 2, and a rotating shaft-insertion hole (not shown)

through which the rotating shaft 23 is inserted is formed at the lower portion of the center of the partition walls 2.

The position sensor 51 disposed at the end of the first discharging groove 26 outputs a signal for stopping the motor 27 to the controller 60, when infrared laser radiated from a light emitting unit 51*a* is reflected from the reflective units 4 at the ends of the partition walls 2 of the rotating body 1 and reaches a light receiving unit 51*b*, by using a photo-interrupter composed of the light emitting unit 51*a* radiating infrared laser and the receiving unit 51*b* receiving the laser from the light emitting unit 51*a*.

FIGS. 5A and 5B are perspective views showing other embodiments of the rotating body 1 in the automatic drug dispensing and dosing time reminder device according to the present invention, in which the number of spaces defined the rotating body 1 where one dose of medication is stored is determined by increasing or decreasing the number of partition walls 2 in accordance with the dose number of times, and a user selects desired one of various types of rotating bodies 1.

The outlet 41, as shown in FIG. 3, is connected with a discharging channel 42 corresponding to the first discharging groove 26 formed at one side on the top of the main body 30, and a drug pack sensor 52 that senses whether there is a drug pack with one dose of medication is disposed at the outlet 41, in which the drug pack sensor 52 is implemented by a phototransistor composed of a light emitting unit 52*a* disposed on the bottom of the outlet 41 and a light receiving unit 52*b* disposed on the ceiling surface of the outlet 41.

Figure 4:
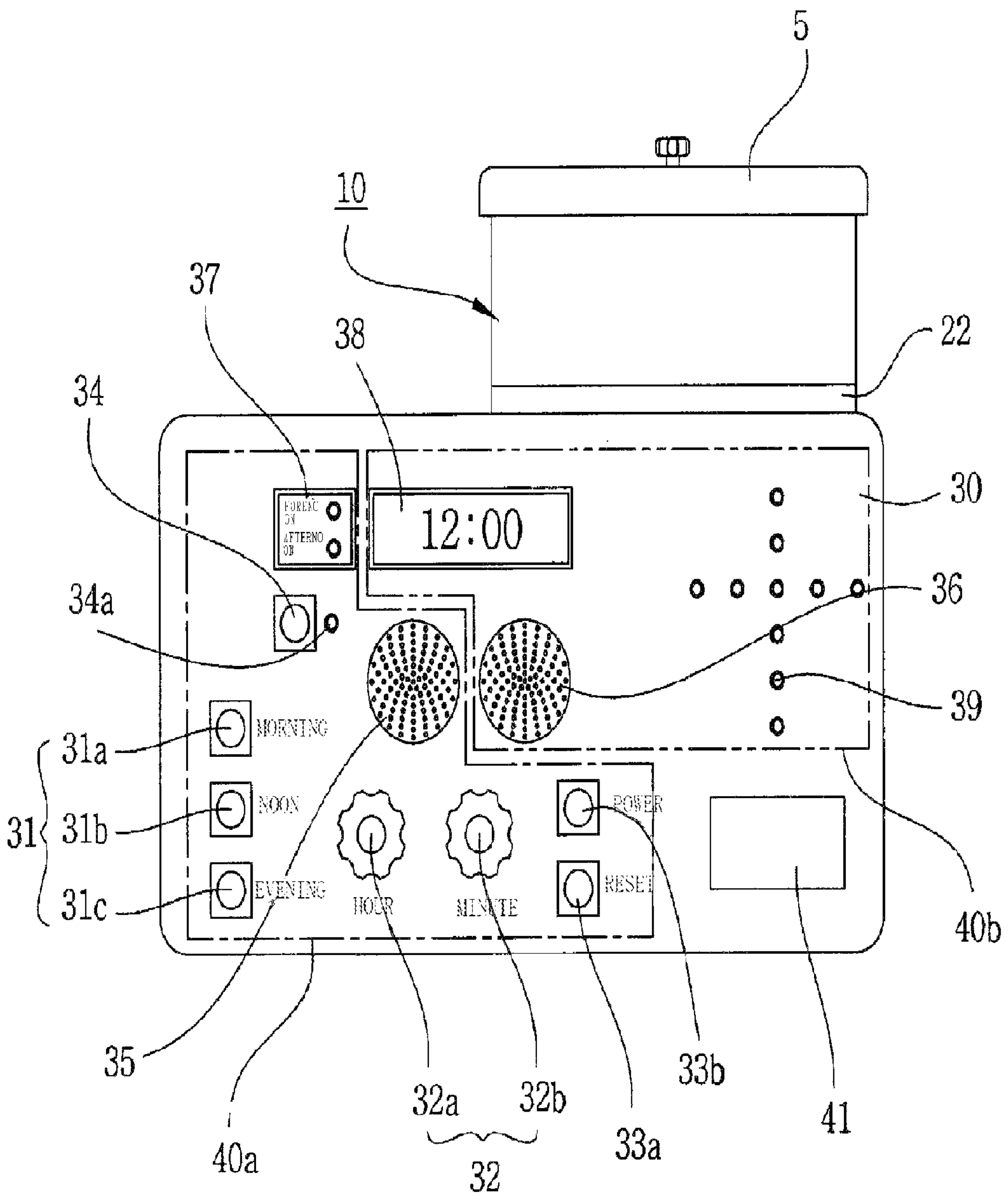
FIG. 4 is a front view of the automatic drug dispensing and dosing time reminder device according to the present invention.
Figure 5:
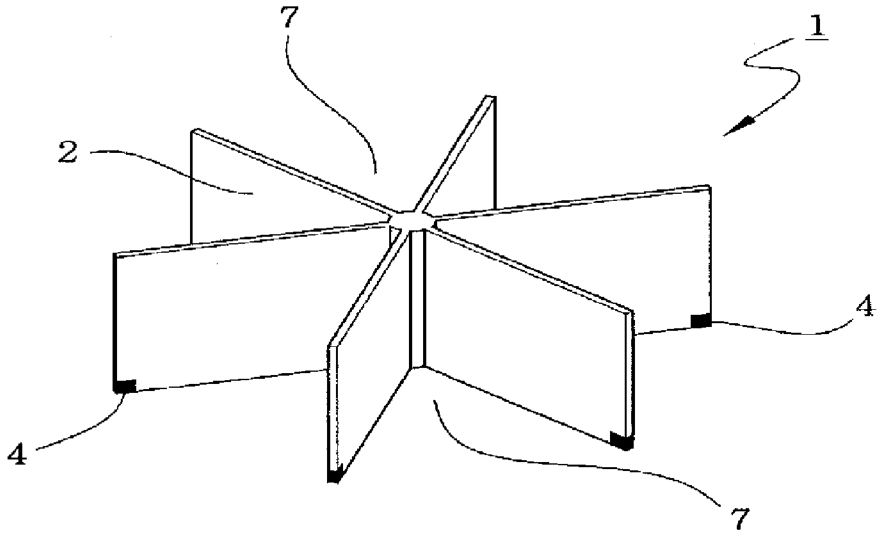
FIGS. 5A and 5B are perspective views showing other embodiments of the rotating body in the automatic drug dispensing and dosing time reminder device according to the present invention.
Figure 5:
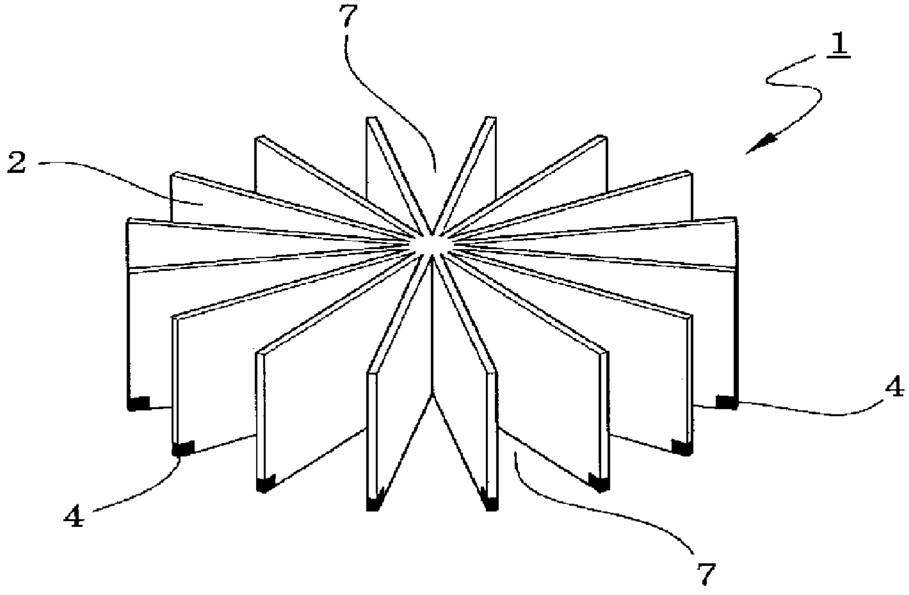

FIG. 4 is a front view of the automatic drug dispensing and dosing time reminder device according to the present invention, in which the input unit 40*a* for setting basic information required to operate the system has a dosing time set part 31 composed of first to third set buttons 31*a*~31*c* for setting dosage time in the morning, noon, evening in a day, a time set part 32 having hour and minute adjusting volumes 32*a*, 32*b* for setting the current time and dosage times, a power button 33*b* for supplying power to the system, a reset button 33*a* for initializing the system, a record button 34 and a microphone 35 for recording a voice message telling it's the dosing time, and a midday set part 37 for determining a.m./p.m. when setting the current time.

Further, the output unit 40*b* that outputs a result on the basis of the information set by the input unit 40*a* is composed of a time indicating part 38 that shows the current time and the dosing time, a speaker 36 that outputs the voice message telling it's the dosing time, and an indicating lamp 39 that visually shows the dosing time.

Figure 6:
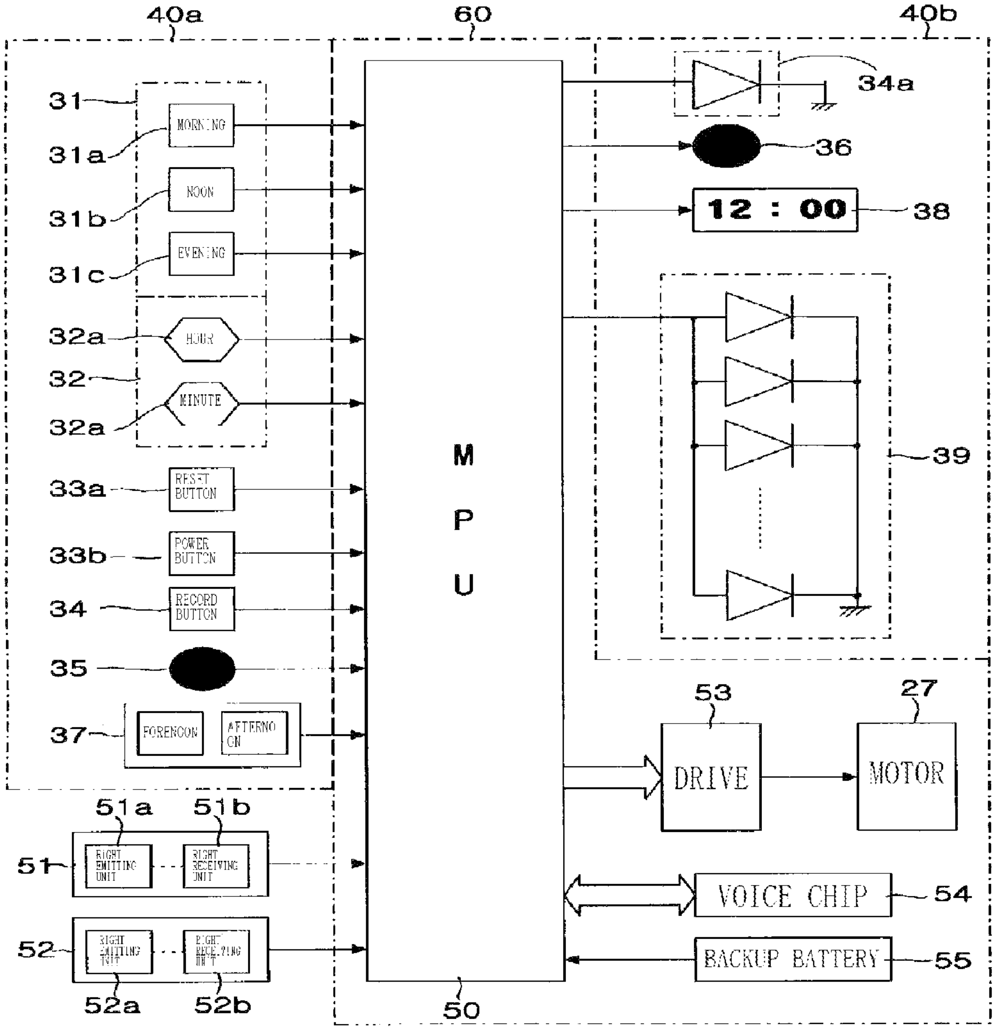
FIG. 6 is a block diagram of automatic drug dispensing and dosing time reminder device according to the present invention.

FIG. 6 is a block diagram of automatic drug dispensing and dosing time reminder device according to the present invention, which shows an electric circuit between the controller 60 and the input unit 40*a*, and the output unit 40*b*, the position sensor 51, and the drug pack sensor 52.

As shown in FIGS. 7 to 13, a microprocessor unit 50 (hereafter referred to as 'MPU') that controls the system on the basis of a stored program is provided. The input unit 40*a* composed of the dosage time set part 31 composed of the first to three set buttons 31*a*~31*c*, the time set part 32 composed of the hour and minute adjusting volumes 32*a*, 32*b* to set the current time and the dosing times, the reset button 33*a* for initializing the system, the power button 33*b* for supplying power to the system, and the record button 34 and the microphone 35 for recording a voice message telling it's the dosing time; the position sensor 51 that senses the stop time of the motor 27 after one does of medication is discharged; and the drug pack sensor 52 that senses whether there is a drug pack are separately connected to input terminals of the MPU 50.

The output unit 40*b* composed of a record indicating lamp 34*a* that blinks to visually show a recording state, when a voice message is recorded through the microphone 35, the speaker 36 that outputs the voice message telling it's the dosing time, the time indicating part 38 that indicates the current time and the dosing time, and the indicating lamp 39 that blinks at the dosing time to visually show that it's the dosing time is connected to an output terminal of the MPU 50, and a motor 27 is also connected to another output terminal through a drive 53.

A voice chip 54 that stores a basic voice message telling it's the dosing time and a voice message transmitted by the record button 34 and the microphone 35 is connected to a side of the MPU 50, and the voice chip 54 is controlled to store and play the voice messages by the MPU 50. Further, a backup battery 55 is connected to a power terminal of the MPU 50 to prevent the input information from being deleted by a power failure etc.

The assembly process of the automatic drug dispensing and dosing time reminder device having the configuration according to the present invention is described hereafter.

First, when fixing protrusions 12 on the support edges 11 formed at the lower portion of the container 10 is aligned with the fixing grooves 25 formed in the mounting plate 22 and predetermined pressure is applied, the springs 16 are compressed and the fixing protrusions 12 are fitted in the fixing grooves 25, while the container 10 and the support edges 11 are firmly fixed by the restoring force of the springs 16 such that the container 10 is attachable/detachable to/from the support edges 11 by the fixing protrusions 12 and the fixing grooves 25.

In this position, when the container 10 is fixed to the support edges 11, the first discharging groove 26 and the second discharging groove 15 should be aligned and it is preferable that the first discharging groove 26 and the second discharging groove 15 are automatically aligned, when the container 10 is combined with the support edges 11, by adjusting the position of the fixing protrusion 12 and the fixing grooves 25, in which when the container 10 is fixed to the support edges 11, the rotating shaft 23 protrudes into the container 10 through the through-hole 13.

Next, the assemble is finished by inserting the rotating shaft 23 into the rotating shaft insertion hole (not shown in the figures) formed at the lower portion of the center of the rotating body 1, in which the rotating body 1 is rotated only by the motor 27.

After the assembly is finished, as described above, the operation of the automatic drug dispensing and dosing time reminder device is as follows.

Figure 7:
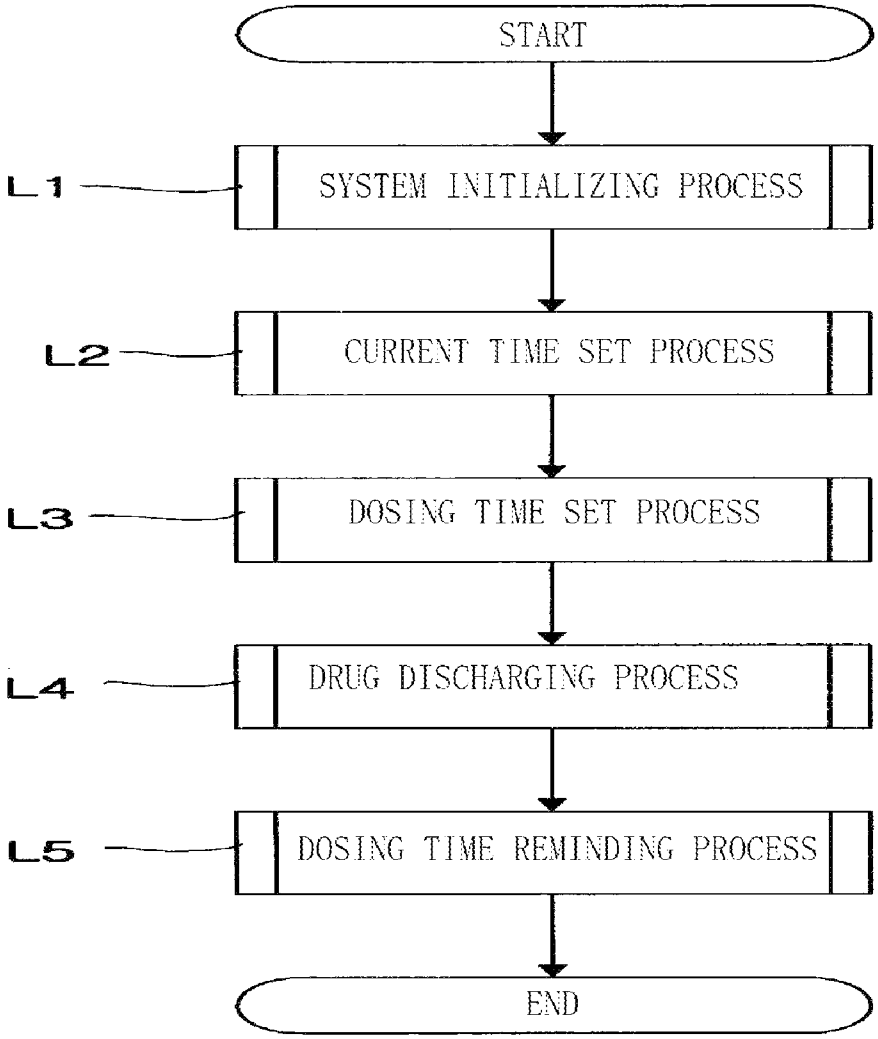
FIG. 7 is a flowchart schematically illustrating the entire operation of the automatic drug dispensing and dosing time reminder device according to the present invention.

FIG. 7 is a flowchart schematically illustrating the entire operation of the automatic drug dispensing and dosing time reminder device according to the present invention, in which as the power button 33*b* is turned on, a motor initializing process L1, which operates the motor 27, using the MPU 50, and stops the motor 27 at a position where the position sensor 51 at the first discharging groove 26 is aligned with any one of the reflective units 4 of the rotating body 1, is performed.

In this process, after the motor initializing process L1 is finished, one does of medication is put into the spaces 7 between the partition walls 2 of the rotating body 1.

When the initializing process L1 is finished, the user performs a current time set process L2 for setting the current time by adjusting the time set part 32 composed of the midday set part 37 and the hour and minute adjusting volume 32*a*, 32*b*, and then performs a dosing time set process L3 for setting dosing times in the morning, noon, and evening by adjusting the midday set part 37 and the time set part 32 composed of the hour and minute adjusting volumes 32_a_, 32_b_, and a dosing time set process L3 for setting morning, noon, and evening dosing times by adjusting the dosing time set part 31 composed of the first to third set buttons 31_a_~31_c_ and the time set part 32 composed of the hour and minute set volumes 32_a_, 32_b_.

After the dosing times are set in the dosing time set process L3, a drug discharging process L4 that discharges one dose of medication out of the space 7 of the rotating body 1 which is positioned at the second discharging groove 15 by controlling the motor 27, using the MPU 50, to rotate the rotating body 1 forward as much as the width of the second discharging groove 15 is performed.

Further, when the dosing time is set in the dosing time set part L3, a dosing time reminding process L5 that reads the voice data stored in the voice chip 54 by using the MPU 50 outputs a voice telling it's the dosing time through the speaker 36, and blinks the indicating lamp 39 to visually show it's the dosing time is performed, thereby the entire process is completed.

Figure 8:
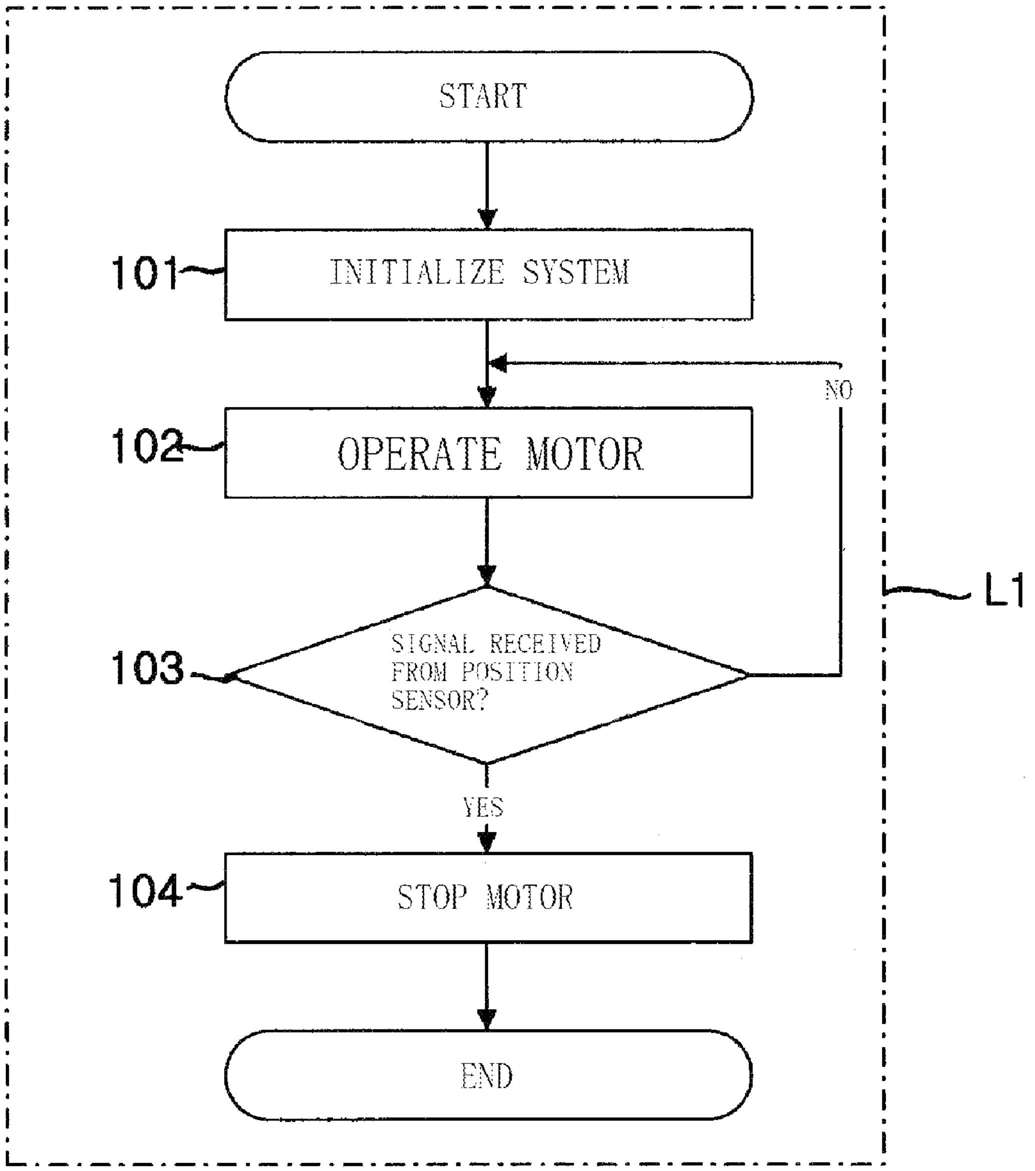
FIGS. 8 through 12 are detailed flowcharts for each process shown in FIG. 7.
Figure 9:
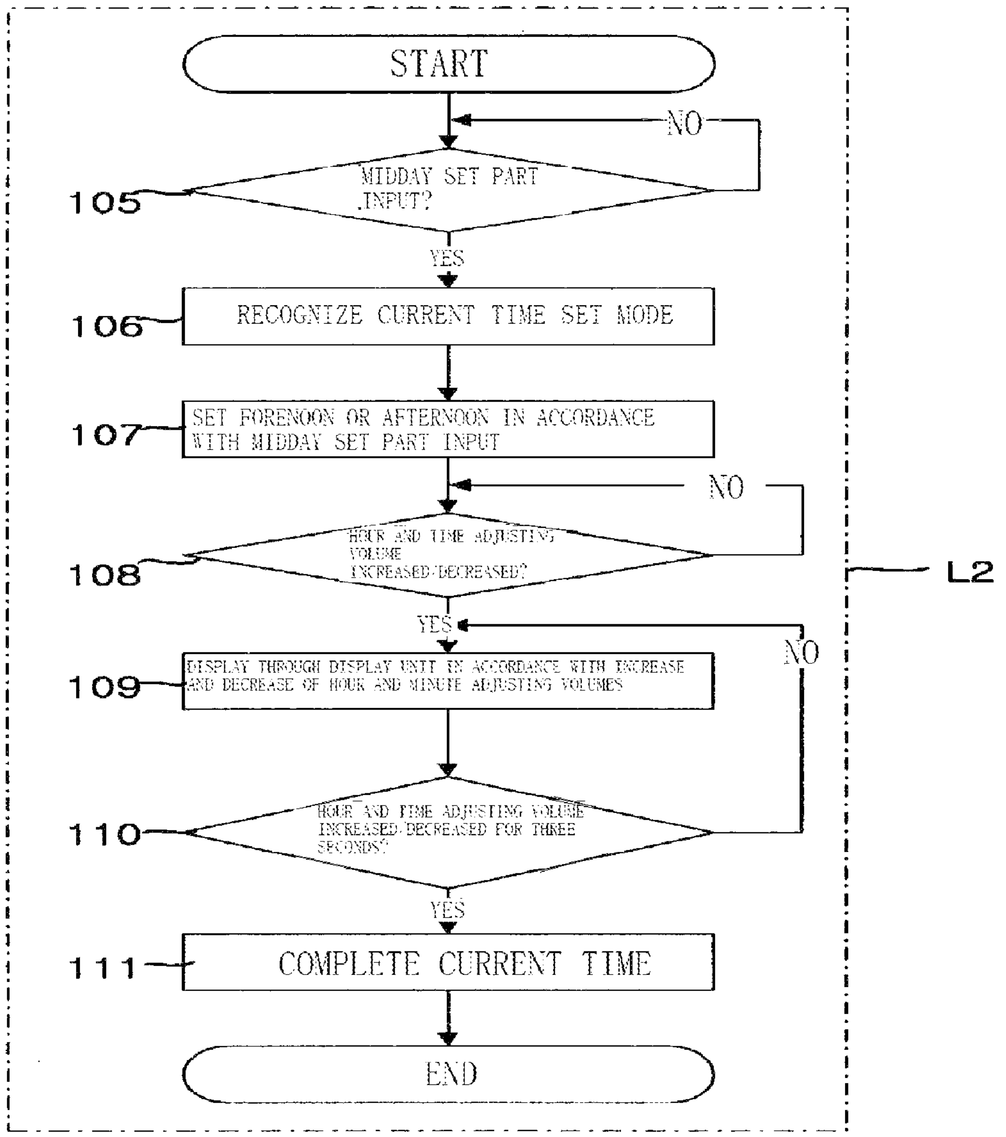
Figure 10:
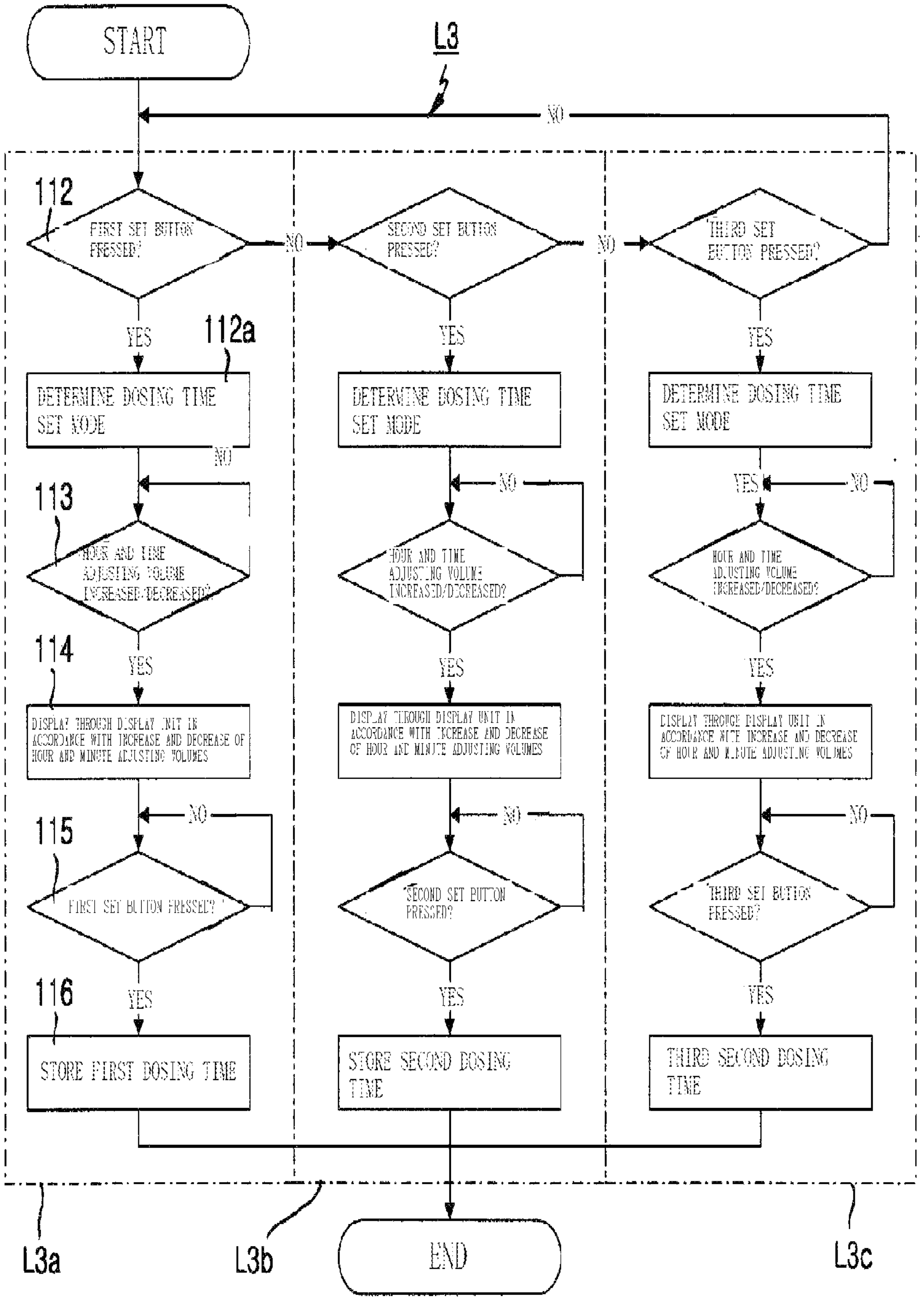
Figure 11:
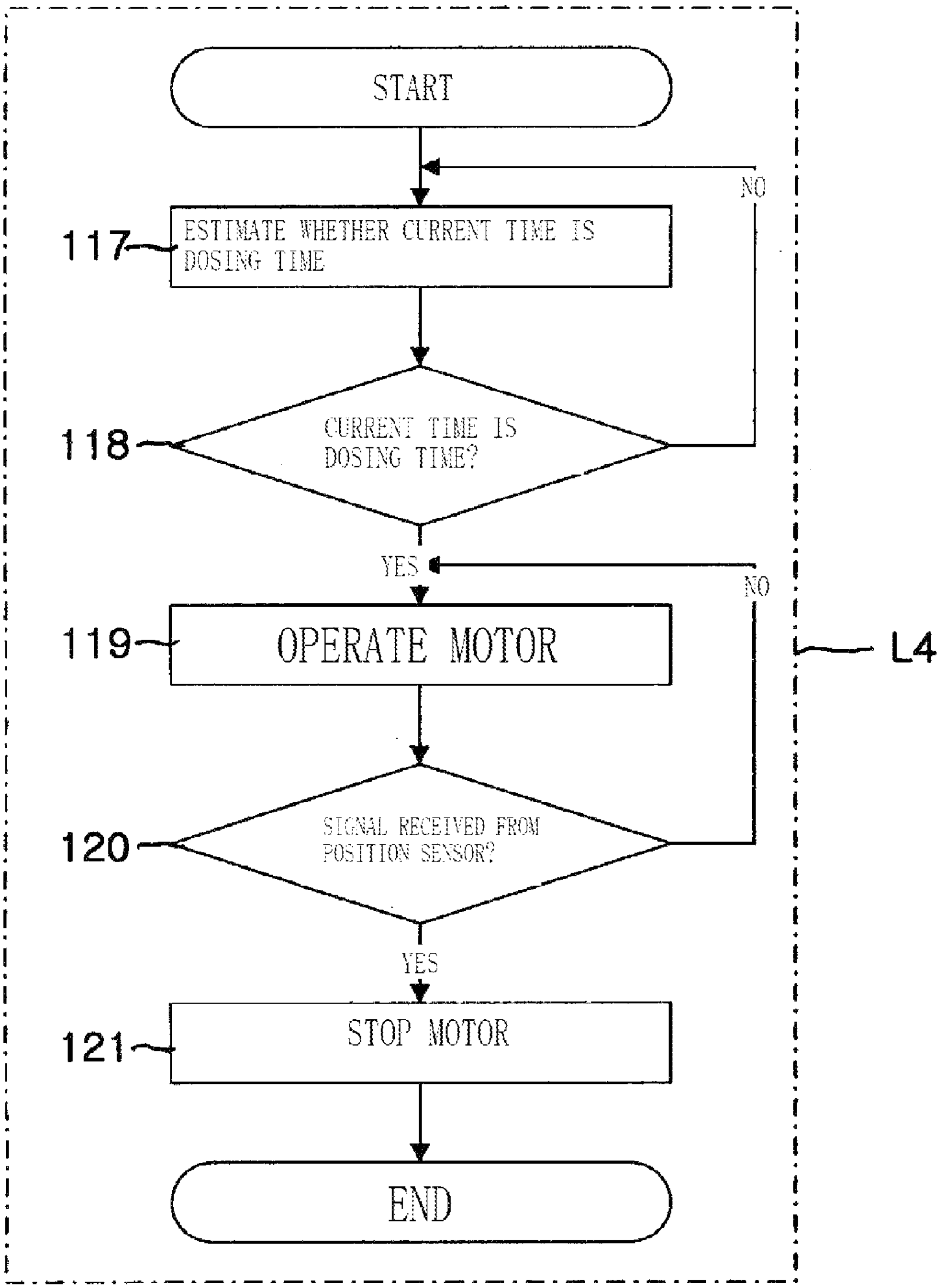
Figure 12:
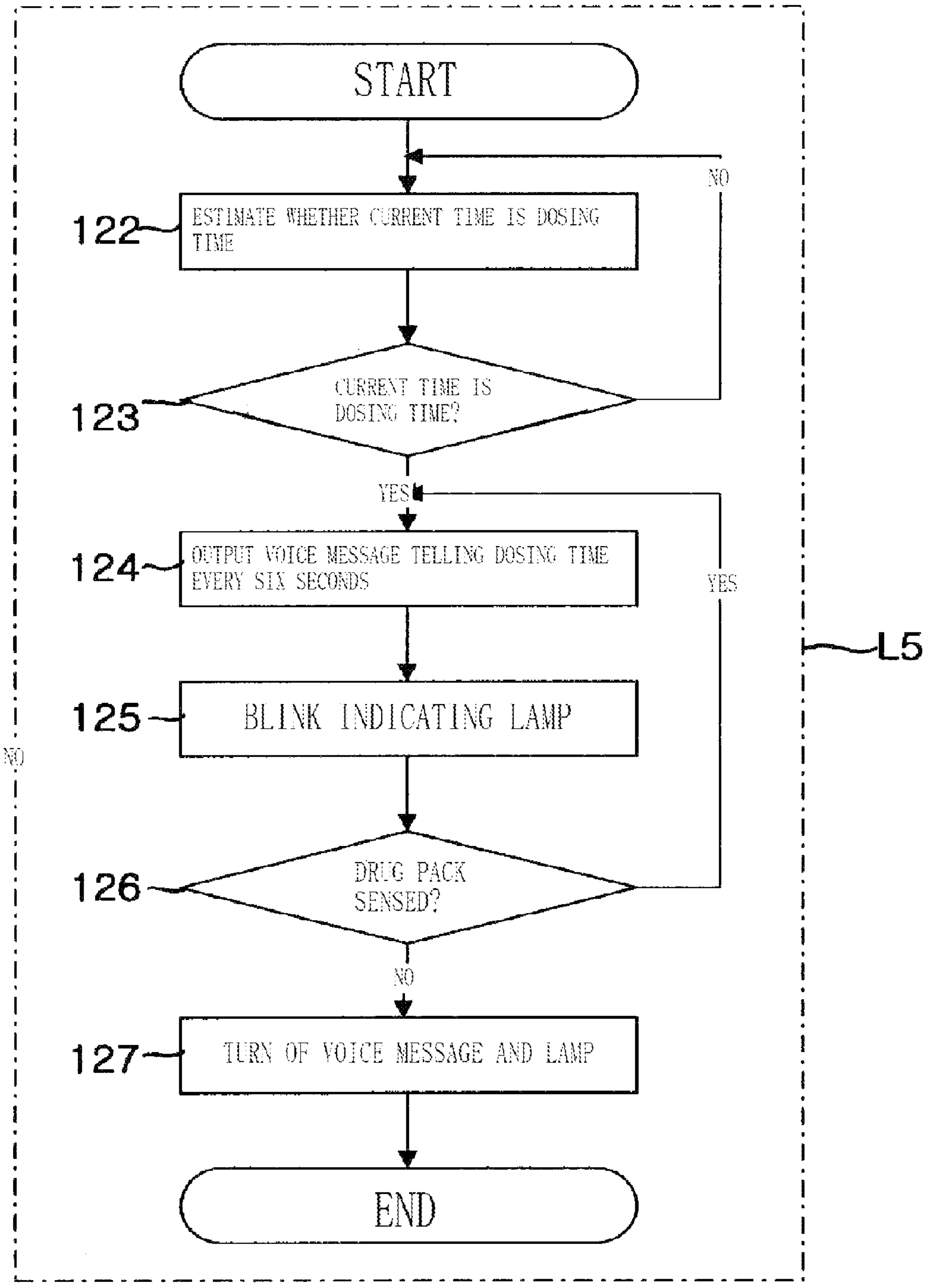

FIGS. 8 and 12 are detailed operation flowchart for each process of FIG. 7, in which FIG. 8 is a detailed flowchart of the initializing process L1, FIGS. 9 and 10 are detailed flowcharts of the current time set process L2 and the dosing time set process L3, FIG. 11 is a detailed flowchart of the drug discharging process L4, and FIG. 12 is a detailed process of the dosing time reminding process L5, which are described hereafter in detail.

First, in the initializing process L1 shown in FIG. 8, as the user turns on the power button 33_b_ to normally operate the automatic drug dispensing and dosing time remainder device according to the present invention, the MPU 50 initializes the system (step 101) and then operates the motor 27 (step 102) to rotate the rotating body 1.

In this process, the light emitting unit 51_a_ of the position sensor 51 at the first discharging groove 26 radiates infrared laser and the infrared laser travels through the spaces 7 between the partition walls 2 of the rotating body 1, whereas the reflective unit 4 at the lower ends of the partition walls 2 of the rotating body 1 reflects the infrared laser radiated from the light emitting unit 51_a_ and the light receiving unit 51_b_ of the position sensor 51 receives the infrared laser reflected from the reflective units 4, and turns on and outputs a control signal to the MPU 50.

Therefore, when determining that an output signal is received by the position sensor 51 (step 103), the MPU 50 completes the initializing process L1 in which the motor 27 is stopped through the drive 53 (104) in a stand-by state, such that any one space 7 between the partition walls 2 of the rotating body 1 and the second and first discharging grooves 15, 26 are accurately aligned.

After the initializing process L1 is completed, the user performs the current time set process L2 for setting the current time, as shown in FIG. 9, by operating the midday set part 37 and the hour and minute adjusting volumes 32_a_, 32_b_.

That is, when the user operates any one of the a.m. and p.m. buttons of the midday set part 37, the MPU 50 recognizes the operation as a current time set mode, and sets a.m. or p.m. in accordance with the input (step 105, 106, and 107).

Thereafter, the user adjusts the hour and minute adjusting volume 32_a_, 32_b_ to accurately set the current time, the MPU 50 recognizes this operation (step 108) and displays the time according to increase/decrease of the hour and minute adjusting volume 32_a_, 32_b_ through the time indicating part 38 (step 109), whereas when it is determined that the hour and minute adjusting volume 32_a_, 32_b_ are not operated for a predetermined time (e.g. 3 seconds) (step 110), it is determined that the current time has been set (step 111), and the current time set process L2 is finished.

After the current time set process L2 is finished, the user, as shown in FIG. 10, performs the dosing time set process L3 for setting the dosing time by operating the dosing time set part 31 composed of the first to third set buttons 31_a_~31_c_ and the hour and minute adjusting volume 32_a_, 32_b_.

That is, when the user presses the first set button 31_a_ to set a morning dosing time, the MPU 50 recognizes and determines this operation as a dosing time set mode (step 112 and 112_a_), and the when the user adjusts the hour and minute volumes 32_a_, 32_b_ to accurately set the dosing time, the MPU 50 recognizes this operation (step 113) and displays the time according to increase/decrease of the hour and minute adjusting volume 32_a_, 32_b_ through the time indicating part 38 (step 114), and when it is determined that the first set button 31_a_ is pressed again (step 115), a first dosing time set mode (L3_a_) for storing information on morning dosing time is finished.

Further, after the morning dosing time is set by completing the first dosing time set mode L3_a_, the user performs the dosing time set process L3 for completing second and third dosing time set modes L3_b_, L3_c_ by pressing the second set button 31_b_ for setting the afternoon dosing time and the third set button 31_c_ for setting the evening dosing time, thereby setting the morning, afternoon, and evening dosing times.

In the present invention, the MPU 50 is programmed such that the dosing time can be set two times by operating one button, when the dosing time is set by operating the first to third set button 31_a_~31_c_, such that the dosing time can be set by six times for one day by operating the first to third set buttons 31_a_~31_c_.

As described above, when setting the current time and the dosing times is completed in the system by completing the initializing process L1, the current time set process L2, and the dosing time set process L3, the drug discharging process L4 for discharging one dose of medication from the space 7 of the rotating body 1 and the dosing time reminding process L5 for telling it's the dosing time with a voice and a lamp are performed, when it is the dosing time set by the first to third set buttons 31_a_~31_c_ and the hour and minute adjusting volume 32_a_, 32_b_.

That is, FIG. 11 is a flowchart illustrating the drug discharging process L4, in which the MPU 50 continuously estimates whether the current time displayed through the time indicating part 38 is the dosing time set by the first to third buttons 31_a_~31_c_ and the hour and minute adjusting volumes 32_a_, 32_b_ (step 117), and when determining the current time displayed through the time indicating part 38 is the dosing time set by the first to third buttons 31_a_~31_c_ and the hour and minute adjusting volumes 32_a_, 32_b_ (step 118), the MPU 50 operates the motor 27 through the drive 53 (step 119), thereby rotating the rotating body 1.

Therefore, one dose of medication 70 in the space 7 defined by the partition walls 2 of the rotating body 1 is pushed by the partition wall 2 of the rotating body 1 and dropped through the second discharging groove 15 and the first discharging groove 26, and the dropped one dose of medication 70 is discharged to the outlet 41 through the discharging channel 42.

In this process, the light emitting unit 51_a_ of the position sensor 51 at the first discharging groove 26 radiates infrared laser, and the infrared laser passes through the spaces 7 between the partition walls 2 of the rotating body 1, but the infrared laser radiated from the light emitting unit 51_a_ is reflected from the reflective unit 4 at the lower ends of the partition walls 2 of the rotating body 1, while the light receiving unit 51_b_ of the position sensor 51 is turned on by receiving the infrared laser returning from the reflective unit 4 and outputs a motor stop control signal to the MPU 50.

Accordingly, when determining that the output signal has been received from the position sensor 51 (step 120), the MPU 50 completes the drug discharging process L4 stopping the motor 27 (step 121) through the drive 53, such that only one dose of medication 70 in the space 7 closest to the second discharging groove 15 is discharged by the reflective unit 4 and the position sensor 51.

FIG. 12 is a flowchart illustrating the dosing time reminding process L5, in which the MPU 50 continuously estimates whether the current time displayed through the time indicating part 38 is the dosing time set by the first to third buttons 31*a*~31*c* and the hour and minute adjusting volumes 32*a*, 32*b* (step 122), and when determining the current time displayed through the time indicating part 38 is the dosing time set by the first to third buttons 31*a*~31*c* and the hour and minute adjusting volumes 32*a*, 32*b* (step 123), the MPU 50 reads out the voice message recorded in the voice chip 54 and outputs it's the dosing time at every six seconds through the speaker 36 (step 124) for reminding, and simultaneously visually showing it's the dosing time by blinking the indicating lamp 39 (step 125).

In this state, when the user does not take out the one dose of medication 70 at the outlet 41, it continually outputs it's the dosing time in a predetermined period (step 124) and simultaneously repeats blinking the indication lamp 39 (step 125)

That is, the light emitting unit 52*a* of the drug pack sensor 52 on the bottom of the outlet 41 radiates infrared laser and the infrared laser is received by the light receiving unit 52*b* on the bottom of the outlet 41.

In this process, when the one dose of medication 70 is not dropped to the outlet 41, the infrared laser from the light emitting unit 52*a* is transmitted to the light receiving unit 52*b* and a control signal is not outputted to the MPU 50, whereas when the one dose of medication 70 is dropped to the outlet 41, the infrared laser from the light emitting unit 52*a* fails to be transmitted to the light receiving unit 52*b*, such that the drug pack sensor 52 outputs a control signal to the MPU 50.

Therefore, when determining that one dose of medication 70 is not detected at the outlet 41 by the drug pack sensor 52 (step 126), the MPU 50 stops outputting the voice message and turns off the indicating lamp 39, thereby completing the dosing time reminding process L5.

The present invention repeating those processes automatically discharges one dose of medication at the scheduled dosage time, in addition to performing the common function of telling every time it's the dosage time set by the user, using a voice and a lamp, such that it is possible to prevent the old with weak sight or children, or even normal adults from taking wrong drugs, thereby increasing reliability of the dosing time reminder device. Further, it is possible to increase efficiency of dosage as much as possible by outputting a voice and blinking a lamp for telling it's the dosing time in a predetermined period, until the user takes out the discharge drug.

Figure 13:
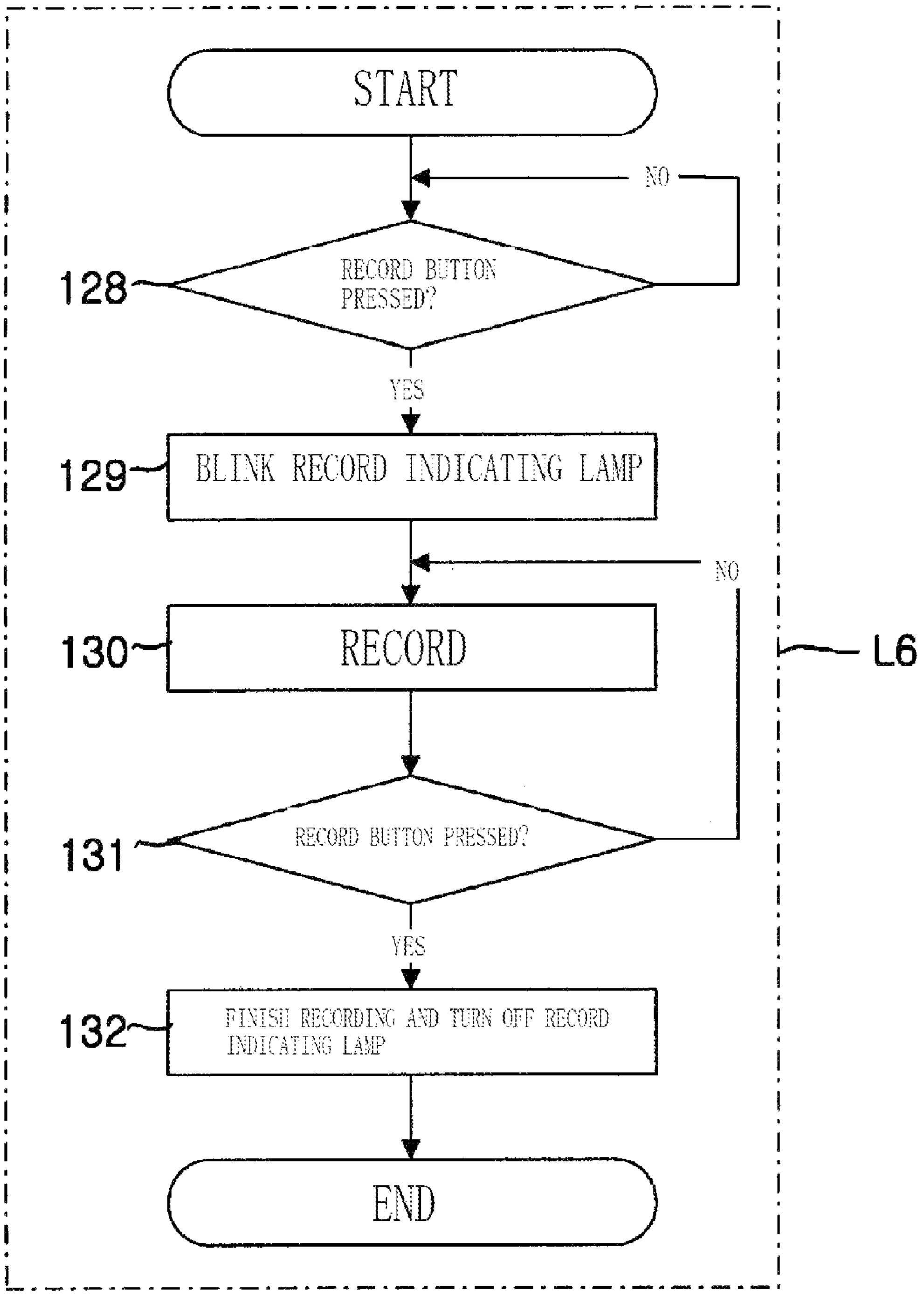
FIG. 13 is a flowchart illustrating the order of recording a voice message in the automatic drug dispensing and dosing time reminder device according to the present invention.

FIG. 13 is a flowchart illustrating the order of recording a voice message in the automatic drug dispensing and dosing time reminder device according to the present invention, in which the voice outputted every dosing time can be recorded and played.

That is, when the user presses the record button 34 to record a voice message telling a dosage time, the MPU 50 determines that it is a record mode (step 128) and blinks the record indicating lamp 34*a* (step 129) to visually show the recording state, and simultaneously stores and records the voice inputted through the microphone 35 to the voice chip 54 (step 130).

Thereafter, when the record is completed and the user presses again the record button 34, the MPU 50 recognizes that the recording is finished (step 131) and finishes the recording, and simultaneously turns off the record indicating lamp 34*a*, thereby completing the recording process L6.

As described above, it is possible to induce intimacy between a patient and the other families and mentally relieve the patient by allowing recording and playing a voice that will be outputted at every dosage time to remind them of the dosage time through the their voice, such that it is possible to improve the efficiency of treatment.

According to the present invention the preset dosing time and the voice data are not deleted by the backup battery 55, even if the power is cut or a power failure occurs, and a user can easily change the dosing time to a desired time by initializing the system by operating the reset button 33*a*, in order to delete the set dosing time and set again a new dosing time, if needed.

The invention claimed is:

1. An automatic drug dispensing and dosing time reminder device, comprising:

an outlet through which one dose of medication is discharged formed at one side of a front of a predetermined-shaped main body;

a circular mounting plate integrally protruding from a top of the main body;

an arc-shaped first discharge groove where a position sensor is disposed at one end on the top of the main body inside the mounting plate;

a rotating shaft protruding through a stepped portion at a center of the mounting plate;

a through-hole through which the rotating shaft is inserted formed at the center of the bottom above the mounting plate and a container having a second discharging groove at one side matching the first discharging groove, the container being detachably disposed on the mounting plate and including a cylindrical case;

a rotating body connected directly with the rotating shaft at the lower portion of the center, the rotating body including partition walls at regular intervals at predetermined angles from a center of the rotating body to define spaces and reflective units attached to the lower ends of the partition walls, the rotating body being disposed in the container;

a motor connected directly with the rotating shaft and rotating the rotating body, wherein the rotating body is disposed at one side in the main body;

a discharging channel formed between the first discharging groove and the outlet such that the first discharging groove and the outlet communicate with each other;

an input unit including a dosing time set part, a time set part, a power button, a reset button, and a midday set part to set information on a current time and a dosing time, and an output unit composed of a time indicating unit, a speaker, and an indicating lamp to output a result according to the information set by the input unit, wherein the input unit and the output unit are disposed on the front of the main body; and a controller that controls the motor by using the information set by the input unit and the position sensor, and displays the information through the output unit, wherein the position sensor is disposed in the first discharging groove and is integrally formed of a light emitting unit emitting infrared ray and a receiving unit receiving a laser from the light emitting unit, and a stop signal of the motor is outputted to the controller when the infrared ray from the light emitting unit is reflected by the reflective unit disposed at an end of the partition wall of the rotating body and reaches the receiving unit.

2. The automatic drug dispensing and dosing time reminder device according to claim 1, wherein the input unit is provided with a record button and a microphone to record a voice message transmitted through the microphone in the controller, and the recorded voice message is played through the speaker.

3. The automatic drug dispensing and dosing time reminder device according to claim 1, wherein a drug pack sensor is additionally disposed at the outlet, such that the controller outputs a voice message telling a dosing time in a predetermined period and blinks an indicating lamp, until a drug pack is taken out of the outlet.

4. The automatic drug dispensing and dosing time reminder device according to claim 2, wherein a drug pack sensor is additionally disposed at the outlet, such that the controller outputs a voice message telling a dosing time in a predetermined period and blinks an indicating lamp, until a drug pack is taken out of the outlet.

* * * * *